United States Patent
Flenker et al.

(10) Patent No.: US 12,397,793 B2
(45) Date of Patent: Aug. 26, 2025

(54) HILL HOLD FUNCTION FOR A MOTOR VEHICLE COMPRISING A PLURALITY OF DRIVEN AXLES

(71) Applicant: Bayerische Motoren Werke Aktiengesellschaft, Munich (DE)

(72) Inventors: Christian Flenker, Baldham (DE); Jonas Lang, Munich (DE); Alexander Zech, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 203 days.

(21) Appl. No.: 18/209,695

(22) Filed: Jun. 14, 2023

(65) Prior Publication Data
US 2023/0406311 A1 Dec. 21, 2023

(30) Foreign Application Priority Data
Jun. 15, 2022 (DE) .................... 10 2022 115 012.7

(51) Int. Cl.
*B60W 30/18* (2012.01)
*B60L 15/20* (2006.01)
(Continued)

(52) U.S. Cl.
CPC .... *B60W 30/18118* (2013.01); *B60L 15/2018* (2013.01); *B60W 10/08* (2013.01);
(Continued)

(58) Field of Classification Search
CPC ................................................ B60W 30/18118
See application file for complete search history.

(56) References Cited

U.S. PATENT DOCUMENTS 7,926,889 B2 * 4/2011 Bell, Jr. .................. B60L 50/52
303/191
10,518,774 B2 * 12/2019 Iwanaka .......... B60W 30/18118
(Continued)

FOREIGN PATENT DOCUMENTS

DE 10 2018 133 649 A1 7/2020
DE 10 2020 122 275 A1 3/2022

OTHER PUBLICATIONS

German-language Office Action issued in German Application No. 10 2022 115 012.7 dated Jan. 24, 2023 (5 pages).

*Primary Examiner* — Michael A Berns
(74) *Attorney, Agent, or Firm* — Crowell & Moring LLP

(57) ABSTRACT

A method is provided for operating a motor vehicle including a first driven axle, with which a first electric drive unit and a first brake mechanism are associated, and a second driven axle, with which a second electric drive unit and a second brake mechanism are associated, in a hill hold operating mode, in which the brake mechanisms are configured to brake the two axles with a predetermined brake torque distribution. According to the method, a hill hold requirement for the motor vehicle is identified and a compensation torque distribution to the two axles, provided in relation to the hill hold requirement, in accordance with the predetermined brake torque distribution is determined. The compensation torque is applied in accordance with the compensation torque distribution, and the compensation torque applied by the respectively associated drive unit is replaced with compensation torque applied by the brake mechanism of the respective axle.

9 Claims, 1 Drawing Sheet

(51) Int. Cl.
  *B60W 10/08* (2006.01)
  *B60W 10/18* (2012.01)
(52) U.S. Cl.
  CPC ......... *B60W 10/18* (2013.01); *B60W 2552/15* (2020.02); *B60W 2710/083* (2013.01); *B60W 2710/18* (2013.01)

(56) References Cited

U.S. PATENT DOCUMENTS

| | | | |
|---|---|---|---|
| 11,021,153 B2* | 6/2021 | Sato | B60W 30/18118 |
| 11,685,263 B2* | 6/2023 | Keller | B60L 3/102 |
| | | | 701/22 |
| 2018/0290655 A1 | 10/2018 | Sato | |
| 2023/0339441 A1* | 10/2023 | Liu | B60T 7/122 |
| 2023/0406311 A1* | 12/2023 | Flenker | B60W 10/18 |

* cited by examiner

HILL HOLD FUNCTION FOR A MOTOR VEHICLE COMPRISING A PLURALITY OF DRIVEN AXLES

CROSS REFERENCE TO RELATED APPLICATION

This application claims priority under 35 U.S.C. § 119 from German Patent Application No. 102022115012.7, filed Jun. 15, 2022, the entire disclosure of which is herein expressly incorporated by reference.

BACKGROUND AND SUMMARY

The invention relates to a method for operating a motor vehicle comprising two axles, which are separately driven in an electromotive manner, and a drive arrangement comprising a control unit for carrying out a method of this type.

Moreover, in known vehicles of this type, a mechanical brake system, for example a hydraulically actuated mechanical brake system, which has a predetermined brake torque distribution to the front and rear axle, is typically installed.

Moreover, in a true 4WD operating mode, the drive torque to be applied (in propulsion mode as well as overrun mode) is allocated to the two separate axle drives.

As a result of the typically opposing force distribution of the drive and the brake on the axles (generally more braking force at the front than at the rear, more driving force at the rear than at the front), the chassis and body are integrated into the load path of bracing holding the two axles against each other. Excess braking force for stopping is generally produced at the front axle first, and shortly afterward at the rear axle. This causes a slight jerk when attempting to stop comfortably, or at the very least produces a creaking noise in the brake system during transition to a stationary position.

In known vehicles, a creaking noise of this type also occurs when using a hill hold assist, when the torque for compensating the grade resistance (referred to here also as compensation torque) is initially applied by means of the two axle drive units, and, if continued driving is no longer expected, the compensation torque is blended over to the mechanical brake system. This makes it possible to terminate an inefficient, static operating state of the electric drive units and avoid overheating of the electric drive units.

On this basis, it is an object of the invention to improve a hill hold operating mode in motor vehicles with two electrically drivable axles.

Each of the independent claims defines, via the features thereof, subject matter which achieves this object. The dependent claims relate to advantageous developments of the invention.

According to one aspect, a method for operating a motor vehicle comprising (a) a first driven axle, with which a first electric drive unit and a first brake mechanism are associated, and (b) a second driven axle, with which a second electric drive unit and a second brake mechanism are associated, in a hill hold operating mode (HHB) is disclosed. The first brake mechanism and the second brake mechanism are configured to brake the two axles with a predetermined brake torque distribution to the two axles. According to different embodiments, the predetermined brake torque distribution for the motor vehicle is pre-set to be constant or can be adapted to different operating conditions.

The method has at least the following method steps, which can be carried out in the stated order or another appropriate order: (i) Identifying a hill hold requirement for the motor vehicle. The hill hold requirement can be specified by hill hold parameter values. (ii) Determining a compensation torque distribution to the two axles, provided in relation to the hill hold requirement, in accordance with the predetermined brake torque distribution. (iii) Applying the compensation torque provided in accordance with the compensation torque distribution at each of the two axles by means of the respectively associated drive unit (=drive compensation torque). (iv) Replacing the drive compensation torque with brake compensation torque applied by means of the respective brake mechanism.

Consequently, when the holding torque is transferred to the brake, there is little or no change to the torque distribution to the axles. There is less creaking and settling. Since creaking in particular disturbs many motor vehicle drivers, less creaking is favorable.

The drive compensation torque, typically applied in an electric manner, corresponds to the compensation torque distribution. The brake compensation torque, typically applied in a hydraulic manner, corresponds to the brake torque distribution which defines the compensation torque distribution.

According to a further aspect, a drive arrangement of a motor vehicle comprising a first driven axle, with which a first electric drive unit and a first brake mechanism are associated, and a second driven axle, with which a second electric drive unit and a second brake mechanism are associated, and a control unit which is configured to activate a method according to an embodiment of the invention is disclosed.

The invention is based inter alia on the consideration that, when the vehicle is held in a stationary position on a hill by way of the electric drives (or by way of a combination of electric drive and brake), the holding torque is transferred to the hydraulic brake, and the electric drives are switched off, after a certain period of time for energy reasons. However, during the transfer process, a creaking noise occurs and the vehicle settles by moving a few centimeters downhill.

The invention is based, then, inter alia, on the idea of controlling the hold of the vehicle on a hill with the electric drives with a drive torque distribution corresponding to the brake torque distribution. Consequently, when the holding torque is transferred to the brake, there is no (or little) change to the torque distribution to the axles, resulting in less creaking and settling.

In particular, the drive torque distribution is adapted or blended from a conventional rear-heavy drive allocation to a front-heavy distribution (identical or at least similar to the conventional front-heavy brake allocation) during the stopping procedure or while the hold in a stationary position is being realized.

According to an embodiment, in the case of a combined hold on a hill using the drive unit(s) and the brake(s), the total torque ratios (brake plus drive) are to be adapted to the brake torque ratio.

According to an embodiment, the two drive units are already activated shortly before the motor vehicle is expected to come to a stop on a hill, and/or shortly before a hill hold requirement for the motor vehicle is identified, with a compensation torque distribution corresponding to a brake torque distribution provided in the current operating conditions. In this way, creaking can already be minimized when coming to a stop, even on a hill.

According to an embodiment, a rear-heavy drive torque distribution, in particular a conventional, rear-heavy drive torque distribution, is blended to a front-heavy distribution, in particular identical to the conventional front-heavy brake torque allocation, during a stopping procedure. In this way, the invention can be implemented in standard vehicle configurations.

According to an embodiment, the two drive units are activated after the motor vehicle has come to a stop on a hill, and/or after a hill hold requirement for the motor vehicle is identified, with a compensation torque distribution corresponding to a brake torque distribution provided in the current operating conditions. In this way, the invention can for example also be implemented when the hill hold requirement is not identified until after stopping.

According to an embodiment, a rear-heavy drive torque distribution, in particular a conventional, rear-heavy drive torque distribution, is blended to a front-heavy distribution, in particular identical to the conventional front-heavy brake torque allocation, while the hold in a stationary position on a hill is being realized. In this way, the invention can be implemented in standard vehicle configurations.

According to an embodiment, the drive compensation torque is replaced by the brake compensation torque after a predetermined hill hold period has elapsed, in particular after a few seconds, for example after one, two, three, five, eight or ten seconds. In this way, the probabilities of continued driving can be assessed in an optimal manner without the friction brake being employed in the meantime on the one hand and with energy-efficient operation of the hill hold on the other.

According to an embodiment, the drive compensation torque is replaced by the brake compensation torque during a blending period, in particular of half a second, one second or a few seconds. In this way, depending on the length of the period, the invention can be implemented without any jerking or at least with little jerking.

According to an embodiment, a portion of the compensation torque is already applied by means of the respective brake mechanism before the drive compensation torque is replaced by the brake compensation torque. The invention can therefore also be used in operating conditions in which a brake mechanism is already in use when the vehicle is being stopped and during transition to a stationary position.

According to an embodiment, the hill hold requirement is specified based on at least one value of at least one hill hold parameter (these parameters may for example be one, a plurality of, or all of the following: a hill incline, a direction of action of the hill incline, an angle of the motor vehicle relative to the direction of action of the hill incline, road grip, total vehicle weight, additional load, etc.) and on this basis the compensation torque distribution provided in relation to the two axles is determined. In this way, the required torque for compensating the grade resistance and/or the desired compensation torque distribution to the two axles can be adapted precisely to the operating conditions.

Further advantages and possible applications of the invention are set out in the following description in connection with the figures:

Other objects, advantages and novel features of the present invention will become apparent from the following detailed description of one or more preferred embodiments when considered in conjunction with the accompanying drawings.

DETAILED DESCRIPTION OF THE DRAWINGS

Both figures show a motor vehicle on a hill, so a grade resistance $F\_H$ is in effect. The latter has to be opposed by a compensation force $F\_K$ to ensure that the vehicle in a hill hold operating mode remains in position (in this case illustrated by the center of gravity SP of the motor vehicle, at which the grade resistance $F\_H$ acts).

Figure 1:
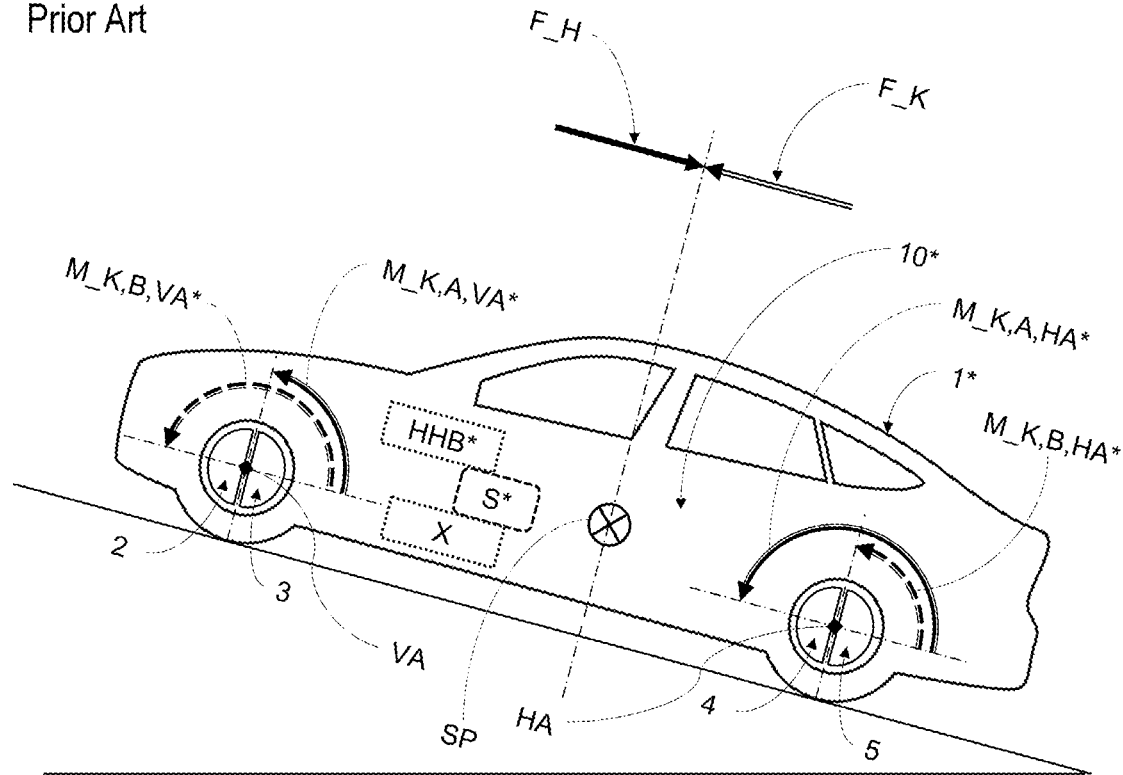
FIG. 1 shows a known drive arrangement, with which a traditional hill hold method can be achieved.

FIG. 1 shows a known drive arrangement 10* of a motor vehicle 1* comprising a first driven axle VA (here, the front axle), with which a first electric drive unit 2 and a first vehicle brake (=first brake mechanism) 3 are associated, and a second driven axle HA (here, the rear axle), with which a second electric drive unit 4 and a second vehicle brake (=second brake mechanism) 5 are associated. The known drive arrangement 10* further has a control unit S*, by means of which a traditional hill hold operating mode HHB* of the motor vehicle can be activated on the basis of a hill hold requirement X.

In the known drive arrangement 10*, a hill hold requirement X is initially detected by means of the control unit S* and consequently, a traditional hill hold operating mode HHB* is activated.

In the traditional hill hold operating mode HHB*, a compensation force $F\_K$ required to compensate for a grade resistance $F\_H$ is initially applied in the form of drive compensation torque by the two electric drives 2 and 4 to the front axle and/or the rear axle. The drive compensation torque is in this case applied in accordance with a conventional drive distribution to the two axles, to a greater extent at the rear axle HA and a small extent at the front axle VA.

If, according to the hill hold requirement X, the hill hold operating mode HHB* is to be maintained for a relatively long period of time, there is blending from this energy-inefficient state after several seconds have elapsed through the use of the vehicle brakes 3 and 5.

In the traditional operating mode, the latter are also applied in accordance with the braking force distribution conventionally provided, so the compensation torque following blending is applied to a greater extent to the front axle VA and to a lesser extent to the rear axle HA.

In the traditional hill hold operating mode HHB*, blending therefore changes the absolute applied compensation torque at each of the two axles VA and HA, and also the compensation torque distribution to the two axles.

Prior to blending, a comparatively smaller drive compensation torque $M\_K,A,VA*$ is applied to the front axle VA; following blending a comparatively greater brake compensation torque $M\_K,B,VA*$ is applied. At the rear axle HA, a comparatively greater drive compensation torque $M\_K,A,HA*$ is applied prior to cross-blending; following cross-blending a comparatively smaller brake compensation torque $M\_K,B,HA*$ is applied.

Due to this change in the compensation torque distribution, the brakes creak during blending, and the vehicle moves several centimeters downhill in a settling procedure.

These undesired effects are avoided or at least considerably reduced by the exemplary embodiment of the invention described below.

Figure 2:
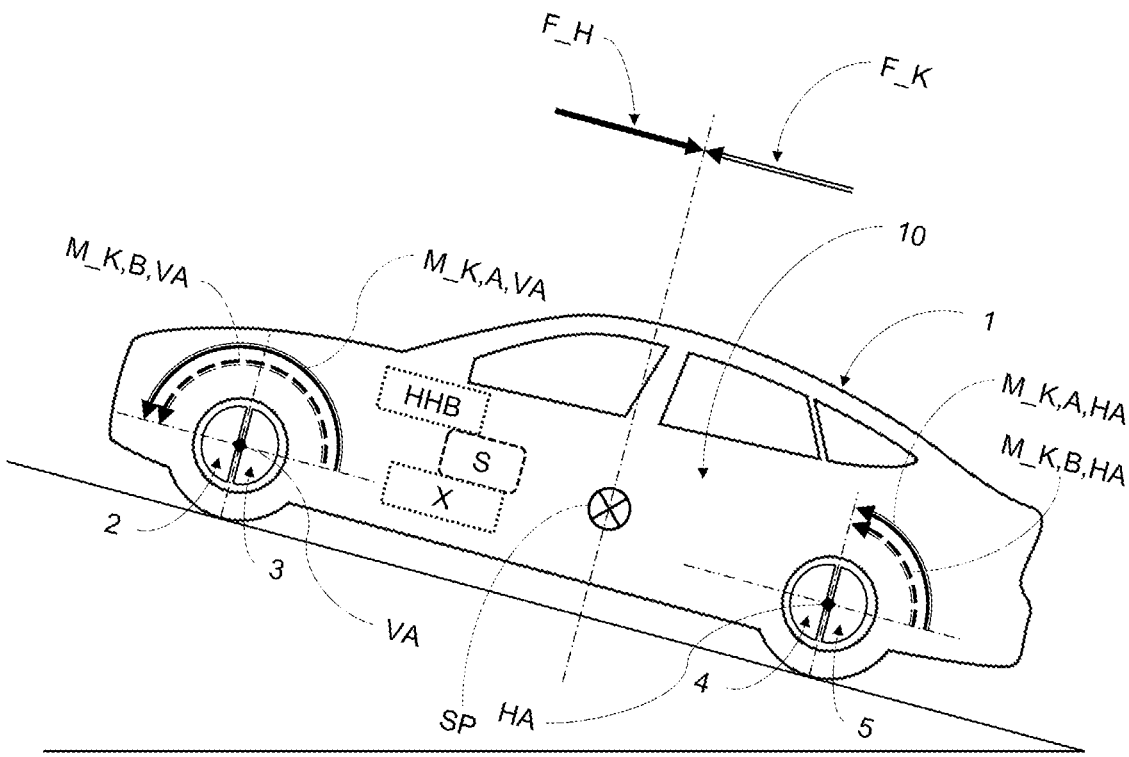
FIG. 2 shows an exemplary drive arrangement, with which a hill hold method according to an embodiment of the invention can be achieved.

FIG. 2 shows a drive arrangement 10 of a motor vehicle 1 according to an exemplary embodiment of the invention.

The drive arrangement 10 has a first driven axle VA (here, the front axle), with which a first electric drive unit 2 and a first vehicle brake (=first brake mechanism) 3 are associated. The drive arrangement 10 further has a second driven axle HA (here, the rear axle), with which a second electric drive unit 4 and a second vehicle brake (=second brake mechanism) 5 are associated. The exemplary drive arrangement 10 further has a control unit S which is configured to activate an exemplary method for operating the motor vehicle 1 in a hill hold operating mode HHB.

In the exemplary method, the following method steps are carried out:

A hill hold requirement X for the motor vehicle is initially identified by means of the control unit S. A compensation torque distribution to the two axles is determined in relation to the hill hold requirement X in accordance with a predetermined brake torque distribution. A hill hold operating mode HHB is activated.

In order to apply the compensation force F_K to compensate for the grade resistance F_H, when a stationary position has been reached, at each of the two axles VA and HA, the respectively associated drive unit 2 or 4 is initially activated in accordance with the compensation torque distribution, so the compensation torque provided for this purpose is already applied by the drive units in the same ratio as subsequently provided by the brakes in accordance with the predetermined brake torque distribution.

If, according to the hill hold requirement X, the hill hold operating mode HHB is to be maintained for a relatively long period of time, there is blending from the energy-inefficient state of holding the vehicle in place via the drive after several seconds have elapsed through the use of the vehicle brakes 3 and 5.

In the exemplary method, the drive compensation torque applied by means of the respectively associated drive unit 2 or 4 (the front axle drive compensation torque M_K,A,VA at the front axle VA and the rear axle drive compensation torque M_K,A,HA at the rear axle HA) is replaced by brake compensation torque (the front axle brake compensation torque M_K,B,VA at the front axle VA and the rear axle brake compensation torque M_K,B,HA at the rear axle HA) which is applied by means of the brake mechanism 3 or 5 of the respective axle VA or HA.

Since the drive compensation torque has already been applied in accordance with the predetermined brake torque distribution, the torque applied to each axle by the drive is replaced during the blending process by torque of equal magnitude applied by the brake.

This can at least greatly reduce undesired creaking and settling and, in an ideal scenario, even avoid them entirely.

The blending process itself can for example take place within one or two seconds, wherein the control unit makes it possible to ensure that, at each axle, the brake torque is increased to the same extent as the drive torque is reduced, so that at any given moment in the blending process the total compensation torque applied to each axle remains the same, and the compensation torque ratio between the two axles also remains the same (in accordance with the predetermined brake torque distribution) at any given moment in the blending process.

In the embodiment, shortly before the motor vehicle comes to a stop on a hill, the two drive units 2 and 4 are activated with a compensation torque distribution corresponding to the predetermined brake torque distribution. A conventional, rear-heavy drive torque distribution is then blended to a front-heavy distribution identical to the conventional front-heavy brake torque allocation during a stopping procedure. In this way, creaking can already be minimized when coming to a stop, even on a hill.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS motor vehicle 1
first electric drive unit 2
first vehicle brake 3
second electric drive unit 4
second vehicle brake 5
drive arrangement 10
grade resistance F_H
compensation force F_K
second driven axle (rear axle) HA
hill hold operating mode HHB
rear axle brake compensation torque M_K,B,HA
front axle brake compensation torque M_K,B,VA
front axle drive compensation torque M_K,A,VA
rear axle drive compensation torque M_K,A,HA
control unit S
vehicle center of gravity SP
first driven axle (front axle) VA
hill hold requirement X

What is claimed is:

1. A method for operating a motor vehicle including a first driven axle, with which a first electric drive unit and a first brake mechanism are associated, and a second driven axle, with which a second electric drive unit and a second brake mechanism are associated, in a hill hold operating mode, in which the first brake mechanism and the second brake mechanism are configured to brake the first driven axle and the second driven axle with a predetermined brake torque distribution, the method comprising:
    identifying a hill hold requirement for the motor vehicle;
    determining a compensation torque distribution to the first driven axle and the second driven axle based on the hill hold requirement and the predetermined brake torque distribution;
    applying a drive compensation torque based on the compensation torque distribution by a respectively associated drive unit; and
    replacing the drive compensation torque with a brake compensation torque applied by a respective brake mechanism;
    wherein the hill hold requirement is specified based on at least one value of at least one hill hold parameter and, on this basis, the compensation torque distribution provided in relation to the first driven axle and the second driven axle is determined.

2. The method according to claim 1, wherein the first electric drive unit and the second electric drive unit are already activated shortly before the motor vehicle comes to a stop on a hill in a ratio corresponding to a brake torque distribution provided in current operating conditions.

3. The method according to claim 2, wherein a drive torque distribution is blended from the second driven axle to the first driven axle during a stopping procedure.

4. The method according to claim 1, wherein the first electric drive unit and the second electric drive unit are activated after the motor vehicle has come to a stop on a hill in accordance with a brake torque distribution provided in current operating conditions.

5. The method according to claim 4, wherein a drive torque distribution is blended from the second driven axle to the first driven axle while a hold in a stationary position on the hill is being realized.

6. The method according to claim 1, wherein the drive compensation torque is replaced by the brake drive compensation torque after a predetermined hill hold time has elapsed.

7. The method according to claim 1, wherein the drive compensation torque is replaced by the brake compensation torque during a blending period.

8. The method according to claim 1, wherein a portion of the brake compensation torque is already applied by the respective brake mechanism before the drive compensation torque is replaced by the brake compensation torque.

9. A drive arrangement of motor vehicle including a first driven axle, with which a first electric drive unit and a first brake mechanism are associated, and a second driven axle, with which a second electric drive unit and a second brake mechanism are associated, and a control unit which is configured to activate a method according to claim 1.

* * * * *